C. G. ROBINSON.
COMPOUND BOARD.
APPLICATION FILED JUNE 16, 1919.
1,344,962.
Patented June 29, 1920.
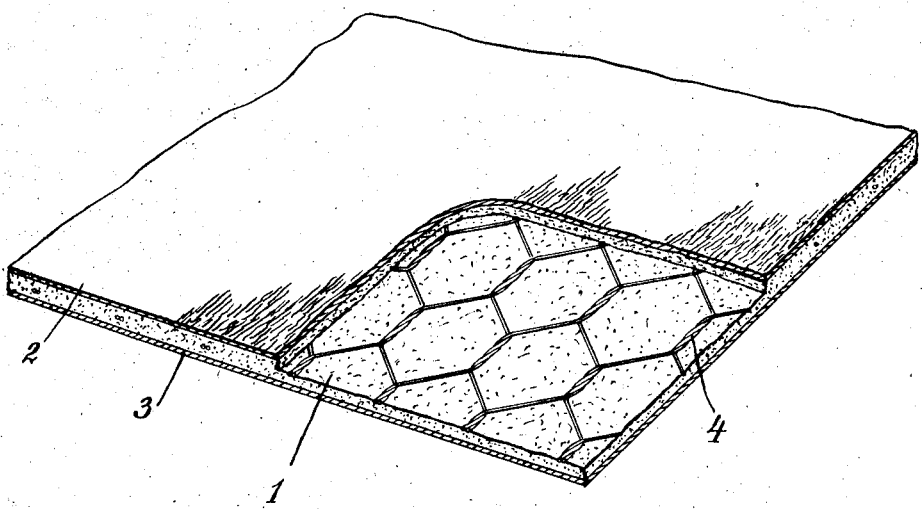
INVENTOR
Charles G. Robinson
BY
ATTORNEYS

UNITED STATES PATENT OFFICE.

CHARLES G. ROBINSON, OF BUFFALO, NEW YORK, ASSIGNOR TO THE BEAVER COMPANY, A CORPORATION OF OHIO.

COMPOUND BOARD.

1,344,962.   Specification of Letters Patent.   Patented June 29, 1920.

Application filed June 16, 1919. Serial No. 304,568.

*To all whom it may concern:*

Be it known that I, CHARLES G. ROBINSON, residing at Buffalo, in the county of Erie, State of New York, have invented certain new and useful Improvements in Compound Boards, (Case B;) and I do hereby declare the following to be a full, clear, and exact description of the invention, such as will enable others skilled in the art to which it appertains to make and use the same.

This invention relates to compound board, and has for its object the provision of an improved compound board.

Various forms of compound or composite boards are on the market for use as building materials. Such compound boards are ordinarily nailed or tacked directly to the studding of a building structure, and in general, are used in place of lath and plaster as the inner wall of the building, or as the inner wall of a room.

There are on the market today two forms of compound or composite board which are recognized by the trade names of wall board and plaster board. As ordinarily manufactured, wall board is composed of a plurality, usually four, plies or sheets of paper stock cemented together by a suitable adhesive, such as silicate of soda. Plaster board consists generally of a sheet or slab of hardened plaster, which may or may not have its surfaces covered with inclosing sheets of paper. Plaster board is fragile, brittle and cannot be subjected to rough handling without objectionable loss from breakage and chipping of the board. Furthermore, as usually manufactured, a high-grade of plastic material must be employed since the finished slab or board is held together solely by the adhesiveness and cohesion of the plastic material after setting. Low or poor grade plastic materials are not, therefore, generally available in the manufacture of plaster board, because, as a result of the handling to which plaster board is subjected, such poor or low grade plastic materials will crumble or break or fall to pieces.

The improved article of the present invention is in general, a plaster board, although it at the same time partakes of the characteristics of ordinary wall board. The invention thus involves the provision of a compound board having an intermediate or body ply composed of plaster, and outside or external plies of wood fiber paper stock. The intermediate ply or body portion of the improved compound board of the invention is reinforced by a reticular member preferably of metal. Thus, I have found interwoven wire, such as ordinary poultry wire, well adapted as the reinforcing member of the plaster ply, but I wish it to be understood that other metallic reticular forms, such as expanded metal and the like, may be used in carrying out the invention.

In the accompanying drawing, I have illustrated what I now consider to be the best embodiment of the invention. The single figure of this drawing is a perspective view, partly in section, of a compound board embodying the novel features of the invention.

The improved compound board of the invention is composed of a main body portion or intermediate ply 1 of plaster. The ply 1 is inclosed between covering sheets 2 and 3 of wood fiber paper stock, such as is now ordinarily employed in the manufacture of wall board. A reinforcing member 4 is embedded in the plaster body 1. In the drawing, I have illustrated the reinforcing member 4 as composed of an interwoven wire, such as ordinary poultry wire. This reinforcing member is introduced into the plaster body 1 while it is in a plastic condition, and upon setting of the plaster, becomes rigidly embedded therein. The reinforcing member 4 serves to hold the plaster sheet 1 together in much the same way that wire glass is held together by the wire mesh embedded therein.

The outer plies 2 and 3 are preferably applied to the plaster body portion 1 before the plastic mass has set or hardened, and in such cases can be satisfactorily secured to the plaster sheet by the application of suitable pressure. If desired, the adhesion of the outer plies 2 and 3 to the plaster sheet 1 may be strengthened by the use of an appropriate cement or adhesive. Ordinarily, however, there will be no need of any such additional cement or adhesive because the plasticity and adhesiveness of the plaster body portion will be sufficient to satisfactorily hold the outer plies in engagement therewith.

Inasmuch as the plaster body portion 1 is held together by the reinforcing member 4, a much lower grade of plaster may be utilized. Generally, I have found gypsum or plaster of Paris a suitable plastic material for the intermediate plaster ply 1. In accordance with the present invention, a relatively cheap and low grade of gypsum or plaster of Paris may be employed in making the plaster ply or body portion 1, because the resistance to crumbling and breaking of the plaster sheet 1 is very materially increased by the embodiment of the reinforcing member 4.

The strength and rigidity of the improved compound board is supplied by the intermediate body ply 1 of plaster. Accordingly, the outer sheets or plies 2 and 3 may be of relatively cheap stock, and thus may be made from ground wood pulp fiber. The outer plies 2 and 3 provide a protective coating for the relatively brittle plaster ply 1, and the finished product of the invention can be handled almost as freely as the ordinary wall board of commerce. The improved compound board possesses the advantage over ordinary wall board, as now manufactured, in that it contains a relatively small proportion of combustible material, and hence will add little, if any, effective fuel in case of fire. Moreover, the reinforcing member 4 being integrally continuous is both plane dimensions and co-extensive with the plaster board will prevent disintegration of the board in case of fire, and thus lessen the danger of the flames spreading.

The outer plies 2 and 3 of the compound board may, if desired, be rendered practically fire-resistant, and when this is done the finished product is substantially fire proof. This is of very great advantage in those communities in which the fire underwriters regard with disfavor any building material of a combustible character. The outer or protective plies of paper stock 2 and 3 are preferably made substantially fire-resistant by applying to the exposed surfaces thereof a coating of a cellulose compound or ester of an organic acid. Thus, I have found the acetate esters of cellulose admirably adapted for this purpose. A solution of cellulose acetate in an appropriate solvent, usually a volatile organic solvent may be used with advantage, and as such a suitable solution I mention, merely by way of example, the cellulose acetate solutions or the so-called cellulose acetate lacquers which are used for coating the fabric of the wings or planes of aeroplanes.

The cellulose acetate solution may be applied to the exposed surfaces of the outer paper plies 2 and 3 in any appropriate manner, as, for example, by coating rolls, or the like. Ordinarily, the volatile solvent of the liquid coating may be recovered. Upon the volatilization of the solvent, there remains on the exposed surfaces of the plies 2 and 3 a film coating of cellulose acetate. This coating penetrates a suitable distance into the pores of the paper plies 2 and 3, and thereby effectively renders these plies practically fire proof. In addition this coating of cellulose acetate renders the compound board substantially moisture proof. The cellulose acetate coating is, furthermore, adapted to receive the ordinary decorative agents, such as paints, and the like, and the board may, accordingly, be painted or decorated as desired.

The coating of cellulose acetate is of further advantage because of the fact that it adds rigidity to the paper plies 2 and 3. In their natural condition, the paper stock plies 2 and 3 possess very little rigidity. The cellulose acetate coating, however, makes these plies remarkably rigid, and practically any desired degree of rigidity can be secured by suitably proportioning the thickness of the cellulose ester coating. This desired result may be obtained by applying one or more coats of the cellulose acetate solution, and the thickness of the resulting coating may, moreover, be controlled by employing solutions of appropriate concentration.

The improved compound board of the invention may be made in the form of panels of appropriate dimensions. For example, panels approximately four feet in width and approximately eight feet in length are well adapted for ordinary building purposes. Heretofore, plaster board panels of these dimensions have possessed little resistance to crumbling, cracking, chipping and breaking during the handling to which they are necessarily subjected. By the protective plies of paper stock coated with cellulose acetate, my improved board is given very substantial resistance to these destructive and deteriorating processes, and there results a rigid tenacious structure which may safely be subjected to the ordinary handling such as materials of this character necessarily encounter in practice without danger of chipping, cracking or breaking.

Considered as a plaster board, it will be readily seen by those skilled in the art that the product of the invention possesses distinct advantages over the heretofore usual construction of plaster board. Increased strength and resistance to crumbling and breaking is secured as the result of embodying in the plaster body ply a reticular reinforcing member. Improved protection of the plaster body ply and increased rigidity is secured by covering the plaster ply with outer plies of wood fiber paper stock coated with cellulose acetate. And in addition, a practically fire proof article is secured because of the fire-resistant property of the cellulose acetate coating. These are important features in a commercial article, and, as far as I am aware, no product of this character has heretofore been commercially produced having these advantageous features.

I claim:

1. As a new article of manufacture, a compound board having an intermediate ply of plastic material reinforced by interwoven wire embedded therein co-extensive with the board and integrally continuous in both plane dimensions, and plies of wood fiber paper stock secured to the outer surfaces of said plaster ply.

2. As a new article of manufacture, a compound board having a body portion composed of plastic material reinforced by a member of reticular form, plies of paper stock secured to the outer surfaces of said body portion, and a coating of a cellulose ester on the exposed surfaces of said plies of paper stock.

3. As a new article of manufacture, a plaster board having covering sheets of paper coated with a cellulose ester.

4. As a new article of manufacture, a plaster board having a reinforcing member of reticular form and covering sheets of paper coated with a cellulose ester.

5. As a new article of manufacture, a compound board having a body portion composed of plaster reinforced by interwoven wire embedded therein, outer plies of paper stock secured to said body portion, and a coating of cellulose acetate on the exposed surfaces of said outer plies of paper stock.

In testimony whereof I affix my signature.

CHARLES G. ROBINSON.